(12) United States Patent
Stewart et al.

(10) Patent No.: US 11,084,336 B2
(45) Date of Patent: Aug. 10, 2021

(54) METHODS AND APPARATUS FOR DETERMINING THE ORIENTATION OF A TIRE MOUNTED DEVICE

(71) Applicant: Schrader Electronics Limited, Antrim (GB)

(72) Inventors: William David Stewart, Antrim (GB); Stephen Robb, Crumlin (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 372 days.

(21) Appl. No.: 16/237,688

(22) Filed: Jan. 1, 2019

(65) Prior Publication Data
US 2019/0329606 A1 Oct. 31, 2019

(30) Foreign Application Priority Data

Apr. 30, 2018 (GB) ..................................... 1807007

(51) Int. Cl.
*B60C 23/04* (2006.01)
(52) U.S. Cl.
CPC ...... *B60C 23/0471* (2013.01); *B60C 23/0488* (2013.01); *B60C 23/0489* (2013.01)
(58) Field of Classification Search
None
See application file for complete search history.

(56) References Cited

U.S. PATENT DOCUMENTS

| | | | |
|---|---|---|---|
| 6,546,982 B1 | 4/2003 | Brown et al. | |
| 7,021,133 B1 | 4/2006 | Hsu | |
| 8,234,919 B2 | 8/2012 | Arnoldo et al. | |
| 9,126,459 B2* | 9/2015 | Stewart | B60C 23/00 |
| 10,052,921 B2* | 8/2018 | Bettecken | B60C 23/0488 |
| 2003/0066343 A1 | 4/2003 | Fischer et al. | |
| 2004/0261510 A1 | 12/2004 | Schulze | |
| 2005/0132792 A1 | 6/2005 | Lemense et al. | |
| 2007/0257666 A1 | 11/2007 | Laure et al. | |
| 2007/0295076 A1 | 12/2007 | Blossfeld et al. | |
| 2009/0088939 A1* | 4/2009 | To | G01P 3/22 701/72 |
| 2011/0169627 A1* | 7/2011 | Fink | B60C 23/0489 340/442 |

(Continued)

FOREIGN PATENT DOCUMENTS

| | | |
|---|---|---|
| CN | 107433827 | 12/2017 |
| DE | 102012216576.2 | 5/2014 |

(Continued)

*Primary Examiner* — Peter J Macchiarolo
*Assistant Examiner* — Jermaine L Jenkins
(74) *Attorney, Agent, or Firm* — Mark H. Williams

(57) ABSTRACT

A method of determining an orientation of a tire mounted device with respect to a wheel rim using an acceleration sensor. With the wheel in a designated orientation and not rotating, a polarity of acceleration along a vertical axis is determined. Then it is determined which of a first absolute orientation or a second absolute orientation the tire mounted device is in depending on the determined polarity. The determined absolute orientation is correlated with the designated orientation to determine which of a first or second orientation with respect to the wheel rim the tire mounted device is in.

28 Claims, 7 Drawing Sheets

(56) References Cited

U.S. PATENT DOCUMENTS

| | | | |
|---|---|---|---|
| 2011/0308310 A1* | 12/2011 | Strahan | B60C 23/0416 |
| | | | 73/146.5 |
| 2011/0313623 A1* | 12/2011 | Greer | B60C 23/0489 |
| | | | 701/49 |
| 2014/0352420 A1 | 12/2014 | Brusarosco et al. | |
| 2017/0284786 A1 | 10/2017 | Dudar et al. | |
| 2019/0111741 A1* | 4/2019 | Moreau | B60C 23/0433 |
| 2019/0279497 A1* | 9/2019 | Sekizawa | B60C 23/064 |

FOREIGN PATENT DOCUMENTS

| | | |
|---|---|---|
| EP | 1433625 | 10/2003 |
| EP | 2777958 | 9/2014 |
| WO | 2017/150396 | 9/2017 |

* cited by examiner

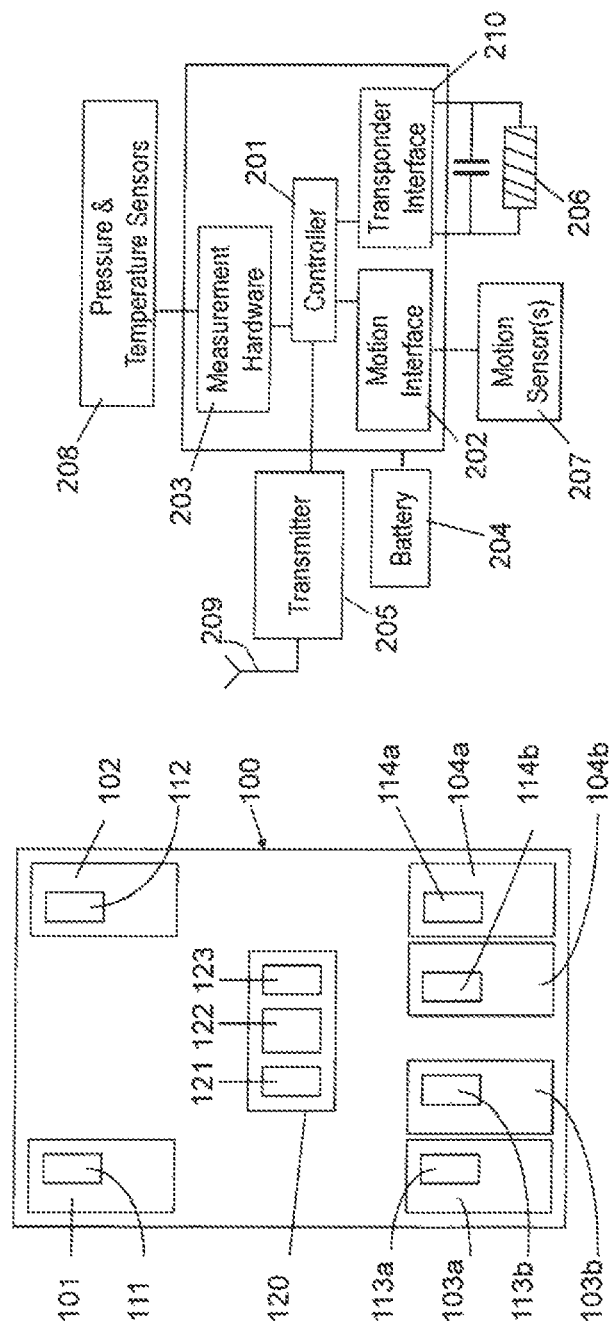

METHODS AND APPARATUS FOR DETERMINING THE ORIENTATION OF A TIRE MOUNTED DEVICE

CROSS REFERENCE TO RELATED APPLICATIONS

This application claims priority under 35 U.S.C. § 119 or 365 to Great Britain Application No. GB1807007.8, filed on Apr. 30, 2018, entitled METHODS AND APPARATUS FOR DETERMINING THE ORIENTATION OF A TIRE MOUNTED DEVICE, the contents of which is incorporated herein by reference in its entirety.

FIELD OF THE INVENTION

The present invention relates to tire monitoring systems, especially Tire Pressure Monitoring Systems (TPMS). The invention relates particularly to determining the orientation of tire mounted sensors.

BACKGROUND TO THE INVENTION

Tire Pressure Monitoring Systems (TPMS) for monitoring tire pressure and/or tire temperature, of the wheels of a vehicle are well known and typically include a wheel unit (commonly referred to as a "TPMS sensor") mounted on each wheel, typically inside the tire. One type of TPMS sensor may be mounted on the stem of the tire valve. Another type, commonly known as a tire mounted sensor (TMS), is mounted on an internal surface of the tire, e.g. on the inner liner of the tire. In any event, the TPMS sensor measures the relevant characteristic(s) of the tire and transmits corresponding information to a remote central monitoring station. It is desirable for the central monitoring system to know the location of the respective TPMS sensors so that the measured characteristics can be associated with the respective wheels.

There are known methods for enabling the system to be able to automatically determine the position of the TPMS sensors. For example, a known auto-location method, sometimes referred to as wireless auto-location (WAL) involves correlating transmissions from the TPMS sensors with antilock brake system (ABS) data from the wheels.

For valve mounted units this method generally works well as the unit is always mounted in the same orientation with respect to the wheel. However, for tire mounted sensors (TMS) the orientation of the monitoring unit with respect to the tire, and therefore with respect to the wheel, cannot always be assumed. This is a problem for auto-location methods in which the orientation of the TMS with respect to the wheel must be known.

WAL and other auto-location methods are used not only on cars, but also on trucks. However, use on trucks is restricted since ABS sensors tend not to be provided on all axles of a truck. Also, it is common for trucks to have dual wheels. Known auto-location methods commonly use differential wheel speed when determining location and so do not work for dual wheels since each wheel of the pair has the same rotational speed.

Methods, such as WAL, for assigning locations to the TPMS sensors on inner and outer dual wheels involves determining the rotational direction in which the TPMS sensor turns during driving. On truck wheels, a valve mounted TPMS sensor protrudes through the (front) wheel face, or dome. For dual wheels, the respective wheels are disposed face-to-face and so their respective TPMS sensors are oppositely orientated with respect to each other. As a result the respective TPMS sensors experience opposite rotational forces. This difference can be used to determine which TPMS sensor is located in the outer wheel and which is in the inner wheel. However, this method relies on the assumption that the TPMS sensors are oriented in the same way with respect to their wheel face, which is always true for valve mounted TPMS sensors but not for tire mounted sensors (TMS).

An advantage of using TMS type sensors over valve mounted type sensors is that information, for example tire footprint length and road surface conditions, can be derived from the output of their accelerometric sensors that is not obtainable from wheel mounted sensors. However, the orientation of the tire mounted sensor must be known in order to derive correct information.

Typically, a tire mounted sensor (TMS) can be mounted on a wheel in either one of two orientations. Conventionally, there are no indicators on tires for passenger cars and trucks to indicate the orientation of the TMS. Moreover, truck tires tend to be bidirectional, i.e. they can be mounted on a wheel rim in either one of two orientations.

It would be desirable to provide improved apparatus and methods for determining orientation of a tire mounted unit with respect to the wheel face on which it is mounted.

SUMMARY OF THE INVENTION

A first aspect of the invention provides a method of determining an orientation of a tire mounted device with respect to a wheel rim on which the tire is fitted to form a wheel, wherein the tire mounted device includes at least one sensor for detecting acceleration along at least one axis, the method comprising:

with said wheel in a designated orientation and not rotating, determining a polarity of acceleration along a vertical axis using said at least one sensor;

determining which of a first absolute orientation or a second absolute orientation said tire mounted device is in depending on the determined polarity;

correlating the determined absolute orientation with said designated orientation to determine which of a first orientation with respect to said wheel rim or a second orientation with respect to said wheel rim said tire mounted device is in.

In some embodiments determining the polarity of acceleration involves determining whether the acceleration along said vertical axis has a magnitude substantially equal to gravitational acceleration.

Typically, said tire mounted device includes a pressure sensor for measuring fluid pressure in said tire, and wherein said determining the polarity of acceleration is performed in response to detecting, using said pressure sensor, inflation of said tire.

Said tire mounted device may include a wireless receiver, and wherein said determining the polarity of acceleration is performed in response to receiving, via said wireless receiver, a signal indicating that the orientation of the tire mounted device with respect to the wheel rim is to be determined.

The method may include mounting said tire mounted device on said tire in either one of a first orientation or a second orientation with respect to said tire. Typically, in each of said first or second orientation with respect to the tire, the device is rotated by 180° with respect to the other of said first and second orientations with respect to the tire about an axis that is normal to a surface on which the device is mounted.

In typical embodiments, in each of said first or second absolute orientations, the device is rotated by 180° with respect to the other of said first and second orientations about a an axis of the device.

Said method may include fitting said tire to said wheel rim in either one of a first or second tire orientation.

In some embodiments, said designated orientation of said wheel is either one of a first designated orientation in which a front face of said wheel rim faces upwards, or a second designated orientation in which said wheel rim faces downwards. The method may include placing said wheel in either one of said first or second designated orientations. The method may include providing to said tire mounted device an indication of which of said first or second designated orientations said wheel is in.

Said tire mounted device may include a wireless receiver, and wherein said providing said indication includes sending a wireless signal to said wireless receiver, said wireless signal including said indication of which of said first or second designated orientations said wheel is in.

Said correlating may involve correlating the determined absolute orientation with whichever of said first or second designated orientations the wheel is in.

Said at least one sensor may be configured to measure acceleration at least along a second axis that is parallel with the rotational axis of the wheel, and wherein said determining the polarity of acceleration involves determining the polarity of acceleration along said second axis.

In some embodiments, in said designated orientation of said wheel, said wheel is upright and in an angular position in which an axis along which said at least one sensor is configured to measure acceleration is vertically disposed. Said axis may be a first axis that extends tangentially with respect to a mounting location of said tire mounted device on the wheel. Said axis may be a third axis that is normal to a surface on which the device is mounted.

The method may include placing said wheel in said designated orientation. Said correlating may involve correlating the determined absolute orientation with said angular position of the wheel.

Said angular position may be a designated one of first and second angular positions in which said axis along which said at least one sensor is configured to measure acceleration is vertically disposed.

Said method may further include providing to said tire mounted device an indication of which of first or second angular positions, in which said axis along which said at least one sensor is configured to measure acceleration is vertically disposed, said wheel is in. Said tire mounted device may include a wireless receiver, and wherein said providing said indication includes sending a wireless signal to said wireless receiver, said wireless signal including said indication of which of said first or second designated angular positions said wheel is in.

The method may include, in response to determining that the wheel has been removed from a vehicle and/or that the tire is deflated, erasing data indicating which of said first orientation with respect to said wheel rim or said second orientation with respect to said wheel rim said tire mounted device is in. Determining that the wheel has been removed from the vehicle may involve determining that the wheel is located on its side. Determining that the wheel is located on its side may involve measuring, using said at least one sensor, acceleration along an axis corresponding to a vertical axis when the wheel is on its side and comparing the measured acceleration with gravitational acceleration. Determining that the wheel is located on its side may involve measuring, using said at least one sensor, acceleration along an axis corresponding to a horizontal axis when the wheel is on its side, and determining whether or not the acceleration is equal to, or substantially equal to, zero, or is less than a threshold value.

A second aspect of the invention provides a tire mountable device, being mountable with respect to a wheel rim on which the tire is fitted to form a wheel, the tire mounted device including at least one sensor for detecting acceleration along at least one axis, and further including a controller configured to determine, with said wheel in a designated orientation and not rotating, a polarity of acceleration along a vertical axis using said at least one sensor; to determine which of a first absolute orientation or a second absolute orientation said tire mounted device is in depending on the determined polarity; and to correlate the determined absolute orientation with said designated orientation to determine which of a first orientation with respect to said wheel rim or a second orientation with respect to said wheel rim said tire mounted device is in.

A third aspect of the invention provides a tire pressure monitoring system comprising at least one tire mountable device that is mountable with respect to a wheel rim on which the tire is fitted to form a respective wheel, the tire mounted device including at least one sensor for detecting acceleration along at least one axis, the system further including a controller configured to determine, with said respective wheel in a designated orientation and not rotating, a polarity of acceleration along a vertical axis using said at least one sensor; to determine which of a first absolute orientation or a second absolute orientation said tire mounted device is in depending on the determined polarity; and to correlate the determined absolute orientation with said designated orientation to determine which of a first orientation with respect to said wheel rim or a second orientation with respect to said wheel rim said tire mounted device is in.

It will be understood that terms such as "vertical", "vertically", "horizontal" and "horizontally" are intended to embrace not only orientations or dispositions that are precisely horizontal or vertical, but also orientations or dispositions that are substantially horizontal or vertical.

Further advantageous aspects of the invention will be apparent to those ordinarily skilled in the art upon review of the following description of specific embodiments and with reference to the accompanying drawings.

BRIEF DESCRIPTION OF THE DRAWINGS

Embodiments of the invention is now described by way of example and with reference to the accompanying drawings in which:

FIG. 1 is a schematic view of a wheeled vehicle with a Tire Pressure Monitoring System (TPMS) in which each wheel has a TPMS sensor mounted within the tire cavity;

FIG. 2 is a schematic representation of a typical TPMS sensor;

DETAILED DESCRIPTION OF THE DRAWINGS

Figure 3:
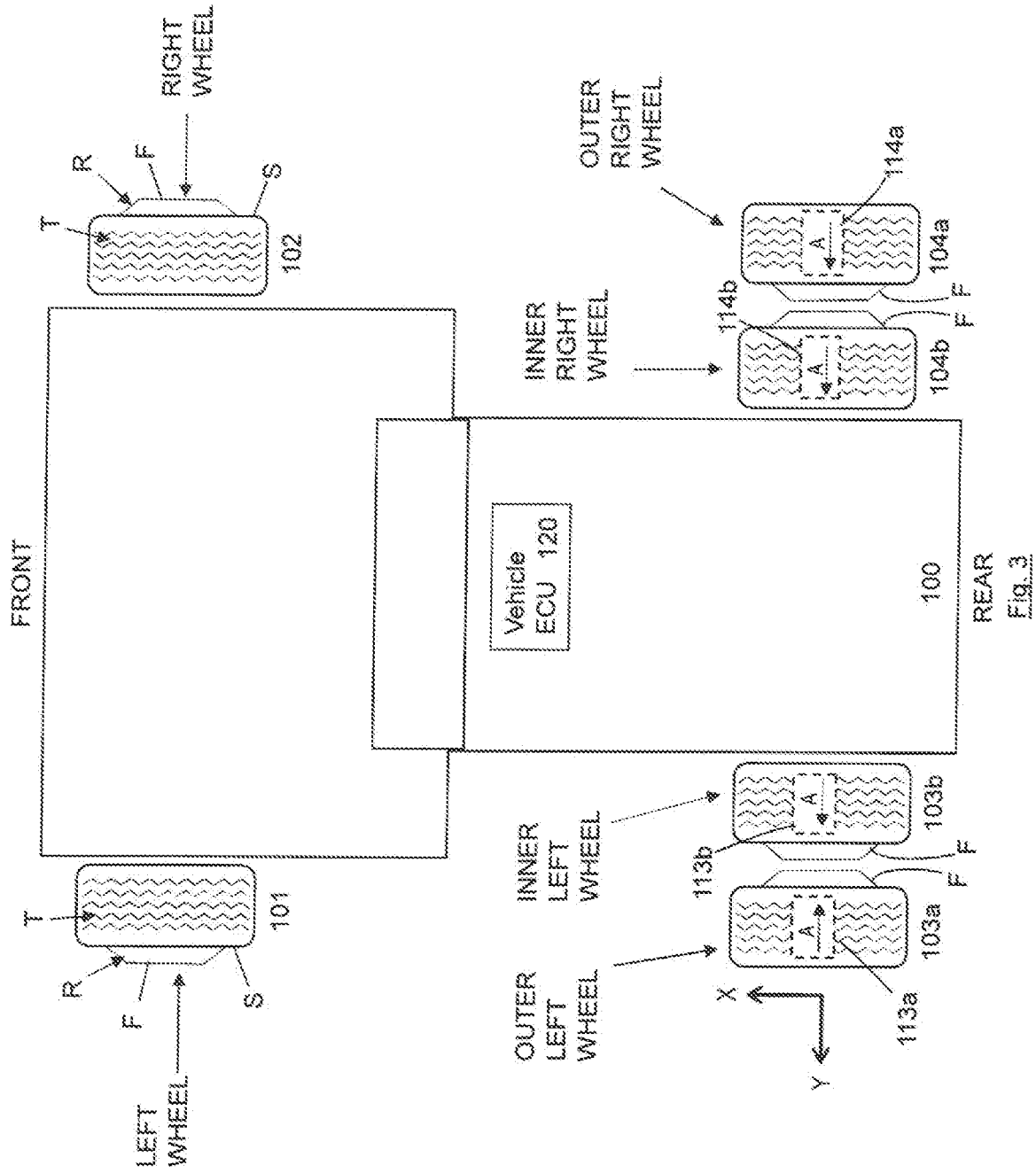
FIG. 3 is a schematic plan view of a vehicle with dual rear wheels.

FIG. 1 shows a system diagram of a wheeled vehicle 100, each wheel including a tire mounted on a rim. The arrangement and number of wheels can vary depending on the vehicle. In this example 6 wheels are shown 101, 102,103a, 103b, 104a and 104b. Each wheel is fitted with a wheel unit comprising a tire monitoring device. In preferred embodiments the wheel unit is a tire pressure monitoring device, also known as a TPMS sensor or TPMS device, 111, 112, 113a, 113b, 114a and 114b, and is a tire mountable component of a tire pressure monitoring system (TPMS). In preferred embodiments, the TPMS device is of a type, commonly referred to as a tire mounted sensor (TMS), that is intended for mounting on an internal surface of the tire, especially in the tread region, rather than a type that is mounted on the rim of the respective wheel or on the valve stem.

The vehicle 100 includes a control unit, for example electronic control unit (ECU) 120, which is configured to receive and process transmissions from the TPMS devices 111, 112, 113a, 113b, 114a and 114b and as such forms part of the TPMS. The ECU 120 typically comprises at least a TPMS receiver 121, a controller 122, and a means of communicating with other vehicle electronics 123, such as a CAN or LIN bus, or a display and/or display driver. The TPMS receiver 121 receives signals, typically wirelessly, from the TPMS devices 111, 112, 113a, 113b, 114a and 114b and the controller 122 is configured to process the signals to perform tire pressure monitoring, the nature of which may vary from system to system.

FIG. 2 shows a block diagram of an embodiment of the TPMS device 111, 112, 113a, 113b, 114a, 114b. The TPMS device includes a controller 201, which may comprise a suitably programmed processor, for example a dedicated microprocessor or a microcontroller, or other programmable processing device. Standard components such as a RAM memory, an ADC, an I/O interface, a clock oscillator and a central microprocessor (not shown) may be provided, the components typically being integrated onto a single chip. Alternatively, a custom microcontroller, for example an Application Specific Integrated Circuit (ASIC), designed specifically for the TPMS application may be used and may integrate ancillary components such as a temperature sensor.

The TPMS device is typically powered by a battery 204 although other micro power sources may be used, e.g. thermoelectric and/or piezoelectric generators and/or electromagnetic induction device, instead of or in addition to the battery.

The TPMS device includes a first wireless communications device, typically comprising a transponder 206. The transponder 206 may be provided to receive command signals from and/or to transmit signals to a separate device (not shown in FIG. 2) for the purposes of programming and/or interrogating the TPMS device. The transponder 206 is typically configured to support low frequency (LF) wireless communication, for example at 125 kHz, or other frequency in the low frequency (LF) range (30 kHz to 300 kHz). In alternative embodiments, wireless communication in any other convenient frequency range may be supported. Advantageously, the transponder 206 provides relatively low power transmission, and LF signals are particularly suited to short range communication and limit the degree of crosstalk from devices further away. The transponder 206 typically comprises an antenna coil. A capacitor may be provided in shunt with the antenna coil.

The TPMS device includes one or more sensors 207 that are responsive to acceleration and/or changes in acceleration experienced during rotation of the wheel to generate a corresponding output signal. By way of example, the sensor(s) 207 may comprise one or more accelerometer. Alternatively or in addition, the sensor(s) 207 may comprise one or more shock sensor or microelectromechanical systems (MEMs) sensor. More generally, the sensor(s) 207 comprise one or more acceleration sensor, force sensor, displacement sensor or rotation sensor. In preferred embodiments, the sensor(s) 207 are of a type that measure, or are otherwise responsive to, absolute or static acceleration (for example accelerometers having capacitive sensing element(s)).

Figure 4:
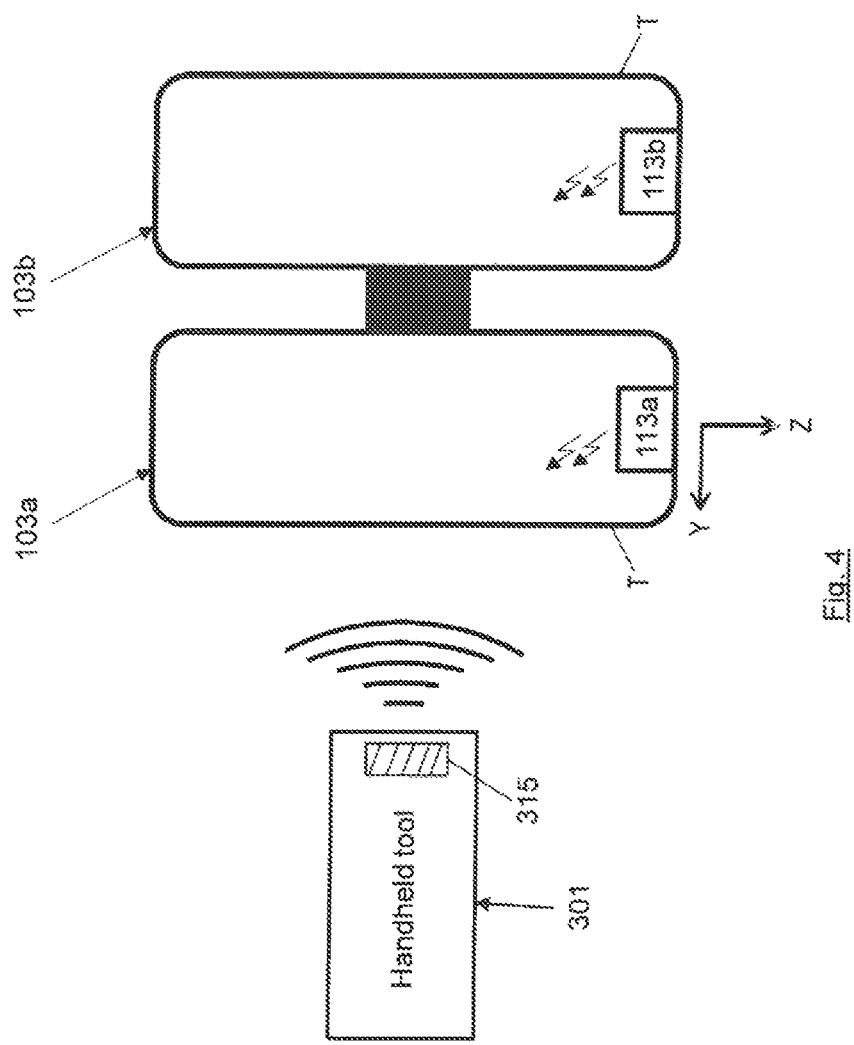
FIG. 4 is a schematic view of a pair of dual wheels and an interrogation device.
Figure 5:
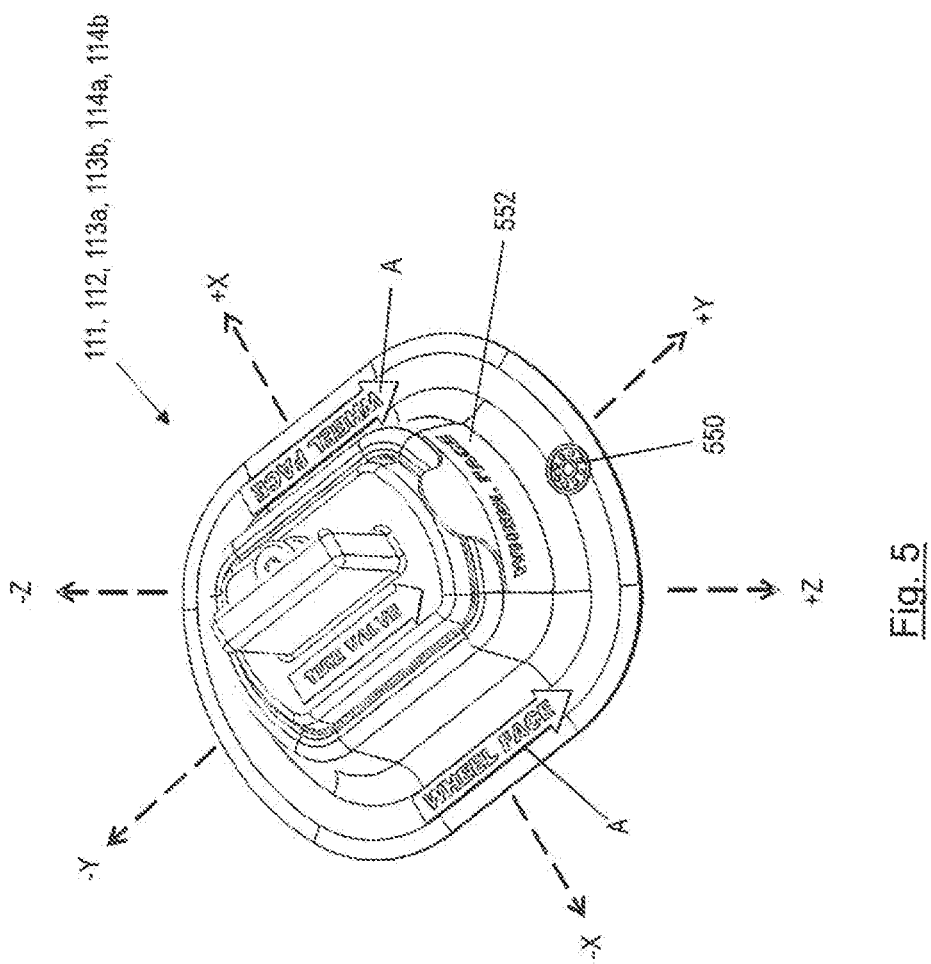
FIG. 5 is a perspective view of a TPMS wheel unit.

In preferred embodiments, the sensor(s) 207 are responsive to forces (or accelerations) acting along first, second and third mutually perpendicular axes. With reference to FIGS. 3, 4 and 5 in particular, the first axis (which may be designated as the X-axis) extends tangentially with respect to the location of the TPMS sensor on the respective wheel. The second axis (which may be designated as the Y-axis) is parallel with the rotational axis of the respective wheel. The third axis (which may be designated as the Z-axis) extends normally to the tire surface where the TPMS device is located. Depending on what type of sensor 207 is used, responsiveness to acceleration along these axes may require one, two or three sensors. For example, three suitably orientated single axis accelerometers may be used, or one three-axis accelerometer, or one single axis accelerometer and one dual-axis accelerometer, as is convenient. It is noted that, depending on the functionality of the TPMS device, the sensor(s) 207 do not have to be capable of detecting forces, or acceleration, along all three axes.

The sensor(s) 207 are connected to an interface unit 202, which may comprise any suitable conventional interface hardware. The controller 201 is connected to the interface unit 202 in order to receive the output from the sensor(s) 207.

In typical embodiments, the controller 201 uses signals generated by the sensor(s) 207 to detect motion of the vehicle. As such, the sensor(s) 207 may be said to form part of a motion detector of the TPMS device.

Alternatively, or in addition, the controller 201 is able to determine at least one aspect of the location of the TPMS device, for example whether it is on the left side or the right side of the vehicle, based on the signals produced by sensor(s) 207 as the wheel rotates. However, such a determination is possible only if the orientation of the TPMS sensor with respect to the wheel face is known. Any suitable methods may be used to provide the right/left and/or clockwise/counter-clockwise information from the sensor(s) 207. By way of example, methods to provide the right/left and/or clockwise/counter-clockwise information are disclosed in commonly owned Stewart, et al., U.S. Pat. No. 7,367,227, entitled Determination of Wheel Sensor Position Using Shock Sensors and a Wireless Solution.

A pressure sensor 208, e.g. a piezo resistive transducer or a piezoelectric or capacitance based pressure sensor, is provided for measuring the fluid (typically air or other gas) pressure in the respective tire. The pressure sensor 208 is connected to measurement apparatus 203 for measuring tire pressure using signals received from the pressure sensor 208 and for providing corresponding pressure information to the controller 201. Typically, the measurement apparatus 203 comprises hardware, i.e. electronic circuitry, for performing its measurement tasks, the configuration of which may vary but typically includes at least one amplifier, may include at least one filter and, for the purposes of routine pressure measurement at least, may include an analogue to digital converter (ADC) (not shown) for measuring pressure values. The measurement apparatus 203 may therefore be described as means for controlling the measuring of pressure. One or more temperature sensor may be similarly provided.

A second wireless communication device typically comprising a transmitter 205 with antenna 209 is used to make transmissions to the vehicle ECU 120. The transmitter 205 is typically an RF transmitter for transmitting in the high frequency (HF) band or higher. For example the transmitter may comprise a UHF transmitter, e.g. transmitting at 315 or 433 MHz, or at 2.4 GHz as used in Bluetooth (trade mark) transmissions. It will be understood that the transmitter 205 may optionally be provided as part of a transceiver.

In typical embodiments, the TPMS device 111, 112, 113a, 113b, 114a, 114b may be generally similar to known TPMS devices and may share many features with those devices already well known to those skilled in the art. The fundamentals of the TPMS system may remain the same—a self-powered TPMS device attached in use to a vehicle wheel, in a manner that allows it to measure the pressure and optionally the temperature of the gas in the tire. Pressure measurements are usually taken periodically. In use the TPMS device transmits data representing the measured parameters to an external controller such as the vehicle ECU 120.

FIG. 3 shows an alternative schematic plan view of the wheeled vehicle 100 on which the tire pressure monitoring system is installed. The vehicle 100, which may for example be a truck or van, has at least one set of dual wheels (rear wheels 103a, 103b and 104a, 104b) in the present example). More generally, the vehicle may comprise one or more sets of single wheels and/or one or more sets of dual wheels, the wheels being provided on a tractor unit or a trailer unit as applicable. The central ECU 120 is able to receive and decode transmissions from the TPMS devices provided in wheels 101, 102,103a, 103b, 104a and 104b.

Each wheel comprises a tire T fitted to a wheel rim R. The rim R may be said to have a front face F (sometimes simply referred to as the face), which is typically the face of the wheel rim R from which the valve (not shown) protrudes. For cars, the front face F is usually the outer face when installed, although for trucks and other vehicles the wheels are commonly bidirectional and so the front face may face inwardly or outwardly when fitted. By way of example, in FIG. 3 the front wheels 101, 102 are fitted with their front faces F directed outwards of the vehicle, while each pair of dual rear wheels 103a, 103b and 104a,104b are orientated with their front faces F facing each other.

Typically, each tire mounted (as opposed to valve mounted) TPMS device can be mounted on a tire T in either one of two orientations. In each orientation, the TPMS device is rotated by 180° with respect to the other orientation about an axis that is normal to the surface on which the TPMS device is mounted (i.e. the Z axis referred to above). In each orientation, a first axis (which may conveniently be designated as the front-to-rear axis) of the TPMS device is aligned with the rotational axis of the tire. This can be seen in FIG. 3 in which the front-to-rear axis of TPMS devices 113a, 113b, 114a, 114b is indicated by arrow A. The head of arrow A points to what may conveniently be designated as the front of the TPMS device. Hence, in one orientation of the TPMS device it is oriented so that its front is disposed towards the front face F of the wheel rim, while in the other orientation the TPMS device is oriented so that its front is disposed away from the front face F.

In order that auto-location can be performed correctly, the orientation of the TPMS device with respect to the wheel rim (e.g. with respect to the front face F or other suitable reference location) needs to be known.

The dual wheel configuration comprises a set (or pair) of wheels mounted together (i.e. side by side and coaxial) but in opposite orientations. For example wheel 103a is mounted facing wheel 103b. In this arrangement, if the respective TPMS devices 113a, 113b are installed in the same orientation with respect to their respective wheel rims, they will detect rotation in an opposite sense to each other. The arrangement shown for wheels 103a, 103b is the preferred arrangement for use with auto-location routines, which rely upon knowing the orientation of the TPMS devices with respect to the wheel rim. In contrast, the TPMS devices 114a, 114b of wheels 104a, 104b are in opposite orientations with respect to the respective wheel rims, and this arrangement would be unsuitable for performing auto-location using methods configured for the arrangement shown for wheels 103a, 103b.

FIG. 4 shows, for the purpose of illustration, one set of dual wheels 103a, 103b. A respective TPMS device 113a, 113b is provided on each wheel 103a, 103b. In particular, each TPMS device 113a, 113b, is mounted on an internal surface of the respective tire T of the respective wheel 103a, 103b. The TPMS device may be mounted directly on the tire surface or indirectly, e.g. via a mount (not shown), as is convenient. In any event the TPMS device may be located at any circumferential location around the wheel/tire. While the following description is provided in the context of the TPMS devices 113a, 113b, it will be understood that the same or similar description applies, as would be apparent to a skilled person, to any one or more of the other TPMS devices that are part of the TPMS, whether installed on a tire of a dual wheel set 103a, 103b and 104a, 104b or of a single wheel 101, 102.

FIG. 4 also shows an electronic device 301 that is capable of communicating wirelessly with each TPMS device located within a wheel. The device 301 is typically a maintenance tool that is operable to program and/or interrogate the TPMS devices as required, and may be referred to as a programing tool and/or a diagnostics tool depending on its functionality. The device 301 can take any convenient conventional form so long as it can communicate wirelessly with the TPMS devices. Typically the device 301 is portable, conveniently being provided as a hand-held unit, but may alternatively be a static device, for example being part of equipment provided on a production line, especially a tire and wheel rim assembly production line.

In preferred embodiments, TPMS device 111, 112, 113a, 113b, 114a, 114b and interrogation device 301 include co-operable wireless communication devices each comprising a respective antenna coil 206, 315 that support a wireless link, preferably an LF wireless link between the TPMS device and interrogation device 301, for example at an LF operating frequency of 125 KHz. In typical embodiments, the wireless link supports a communication channel between the TPMS device and interrogation device 301, which may for example be used to program and/or interrogate the TPMS device as required. The LF link is particularly suited for use in short range interactions between the interrogation device 301 and the TPMS device, which helps to reduce instances of crosstalk with other more distant TPMS devices. The TPMS device and interrogation device 301 may alternatively communication using any other convenient wireless communication link or links.

By way of example, in the programming mode, the interrogation device 301 can provide the TPMS device with data indicating any one or more of: the relative position on the vehicle of the TPMS device, orientation of the TPMS device, if the TPMS device is part of a dual wheel set or not and, if so, if the TPMS device is mounted in the inner or outer wheel.

Scenarios in which a TPMS device is mounted on a tire T, and the tire T is subsequently mounted on a wheel rim R include:

1. At the time of original tire and rim assembly—this typically involves a two stage process of firstly mounting the TPMS device on a tire T, and then fitting the tire to a wheel rim R, and may take place at an OEM facility for the respective vehicle or at a third party assembly site.
2. In the field—this may involve removing the tire T from its rim R and/or of the TPMS device from the tire, e.g. for the purpose of repair or replacement of any one or more of the tire, the TPMS device or the rim, and subsequently re-assembling these components as required, and/or may involve an aftermarket installation of any one or more of the tire, the TPMS device or the rim.

In any case, once the TPMS device and tire T are fitted to the rim R, the assembled wheel may be mounted on a vehicle in any one of a plurality of locations (e.g. front or rear, left or right, inner or outer of a dual set, as applicable), and in either one of two orientations in the case of bidirectional wheels.

There is now described preferred methods for determining the orientation of the TPMS device with respect to the tire T, and the wheel rim R on which the tire T is mounted.

In preferred embodiments, any one or more of the following assumptions may be made as suits the application:
  a) After the original assembly (scenario 1 above), the orientation of the TPMS device with respect to its wheel rim R is known. Preferably the known orientation is a standard orientation, for example the orientation illustrated in FIG. 3 for TPMS devices 113a, 113b in which the front (or other designated part) of the TPMS device is oriented towards the front face of the wheel rim R, and it is aligned with the rotational axis of the wheel/tire. This orientation corresponds with how a valve mounted TPMS device is oriented when fitted to a wheel. More generally, the standard orientation may be defined as a required orientation of the TPMS device with respect to the wheel rim R (and more particularly the front face F of the wheel rim R) on which its tire T is fitted.
  b) In the field, when the TPMS device detects that its wheel has been removed and there is no pressure in the tire, the TPMS device assumes that its tire T has been removed from the rim and/or that the TPMS device itself as been removed from the tire.
  c) When the TPMS device assumes that the tire has been removed and/or that it has been removed from the tire, it erases any currently held orientation data, including data regarding its own orientation with respect to its tire or rim. This is because the tire, or the TPMS device, or both, may be erroneously re-fitted to the wheel rim in an orientation that conflicts the pre-determined initial installation orientation.

A first preferred method of determining the orientation of the TPMS device with respect to the tire, and the wheel rim is now described, the first method being particularly, but not exclusively, applicable in scenario 1 above. This method involves causing the TPMS device to be installed in a desired, or standard, orientation with respect to the wheel rim R (and more particularly with respect to the front face F of the wheel rim R). In preferred embodiments, the TPMS device is mountable on the tire T in either one of two orientations (as described above). Irrespective of in which of these orientations the TPMS device is mounted to the tire T, the tire should subsequently be fitted to the wheel rim R such that the TPMS device is in the desired (or standard) orientation with respect to the wheel rim R.

With reference to FIG. 5, the TPMS device 111, 112, 113a, 113b, 114a, 114b may be provided with one or more markings 550, arrow A, indicating how the TPMS should be oriented with respect to the wheel rim R (i.e. in accordance with the standard orientation). In the illustrated example, marking 550 indicates which side (or front or other relevant part) of the TPMS device should be directed toward the front face F of the wheel rim R. For example this may be achieved by locating the marking on the side of the TPMS device that is to be directed toward the front face F of the wheel rim R. Alternatively or in addition, arrow A may serve as a marking 550. In this case the arrow head indicates, e.g. points to, which side of the TPMS device should be directed toward the front face F of the wheel rim R. The body of the arrow A is advantageously aligned with the axis of the TPMS device that is to be aligned with the rotational axis of the wheel. This is particularly beneficial in embodiments where the TPMS device may be oriented in more than two orientations with respect to the tire T. More generally, therefore, one or more markings may be provided which (individually or collectively) indicate which side of the TPMS device is to be directed towards the front face F of the wheel rim R, and optionally an axis of the TPMS device that is to be aligned with the rotational axis of the tire/wheel.

Preferably, a removable sticker 552 is provided on the TPMS device. The sticker 552 may optionally serve as the marking 550, or as one of the markings 550 where more than one is provided. To this end, the sticker 552 may be located at the side of the TPMS device that is to be directed towards the face F of the wheel rim R. More generally, the sticker 552 may be located on any convenient outer surface of the TPMS device. Optionally, the sticker 552 may carry information relating to the desired orientation to assist a user when mounting the TPMS device on the tire (e.g. the words "WHEEL FACE" and the image of a wheel face in the illustrated example), in which case the sticker may be referred to as a label. Optionally, the sticker, or label 552 may carry information, for example comprising a unique ID, relating to the TPMS device. Conveniently this information may be provided in the form of a barcode, or other machine-readable format.

During assembly of the wheel, a user mounts the TPMS device on the tire T before the tire is fitted to the wheel rim R. The user chooses an orientation when mounting the TPMS device, and in preferred embodiments this involves choosing one or other of the two available orientations. Depending on which orientation is chosen, one or other of the side walls (which may conveniently be referred to as the front side wall S, but may alternatively be referred to as the front face of the tire) of the tire is the side wall that must align with the front face F of the wheel rim R if the desired orientation of the TPMS device with respect to the wheel rim R is to be realised. In the example of FIG. 5, the side wall of the tire that the part of the TPMS device indicated by the marking(s) 550 is directed to is the front side wall of the tire. Once the TPMS device has been mounted on the tire, the user marks the front side wall S. Advantageously, this may be achieved by removing the sticker 552 from the TPMS device and adhering it to the front side wall of the tire. Alternatively, this may be achieved by using any other suitable marker, e.g. ink, paint, chalk or other sticker.

In an alternative embodiment, the front side wall of the tire may be marked as such (in any convenient manner) prior to installation of the TPMS device, and the user mounts the TPMS device on the inner surface of the tire so that the relevant part of the TPMS device (as indicated by the marking(s) 550) is disposed towards the marked front side wall.

In either case, next the tire T is fitted to the wheel rim R such that the marked front side wall S of the tire T is aligned with the front face F of the rim R. As such, the TPMS sensor is oriented in the desired, or standard, orientation with respect to the wheel rim R.

Once the tire T is fitted to the rim R, the TPMS sensor may be programmed with relevant data, for example comprising data relating to any one or more of: the tire, the wheel, the operator, the date, the assembly line and so on. Conveniently the programming is achieved using the tool 301.

The tire T is then inflated (inflation is preferably performed after programming but could alternatively be performed before programming).

The assembly and programming steps described above may be performed as an assembly line procedure whereby different users perform different steps and the relevant component(s) may be conveyed from one assembly station to another.

A second preferred method of determining the orientation of the TPMS device with respect to the wheel rim is now described, the second method being particularly, but not exclusively, applicable in scenario 1 above. This embodiment is particularly suited to cases in which the wheel, i.e. the assembly of the tire and the wheel rim, is laid on its side with its front face F facing upwards or downwards. For example this may be the case when the wheel is being assembled on a conveyor (not shown). In this embodiment, both the face up and face down orientations of the wheel may be referred to as designated orientations of the wheel.

The second preferred method is described with reference to FIG. 6. The TPMS device is mounted on the tire T (601). As described above the TPMS device may be mounted on the tire in either one of two orientations with respect to the tire. The tire (with mounted TPMS device) is then mounted on the wheel rim R (602). In some cases, for example if the tire is for a truck, the tire T may be mounted on the rim R in either one of two orientations (i.e. a bidirectional tire). The assembly of the tire T and rim R is placed in a face F up or face F down orientation (for example on a conveyor) (603). The TPMS device is then programmed with information indicating whether the tire assembly is in a face up or face down orientation (604). Conveniently, this is achieved wirelessly using the tool 301. Optionally, the TPMS device may be programmed with other data at the same time, if required. The tire T is inflated (605). In the illustrated embodiment inflation is performed after the programming of step 604. Alternatively, the inflation may be performed before or simultaneously with the programming. In any event, with the tire and rim assembly maintained in its face up or face down orientation, the TPMS device is caused to check the acceleration detected in a vertical direction (606) to determine an absolute orientation as described below.

In the face up or face down orientation, assuming that the wheel is stationary (in particular not rotating) the only acceleration experienced by the rim and tire assembly in the vertical direction is gravitational acceleration. Depending on the absolute orientation of the TPMS device, the TPMS device detects gravity with one or other of a positive or negative polarity, i.e. as a positive or negative acceleration. In this connection, the sensor(s) 207 of the TPMS device determine the polarity of the detected acceleration, or force, along the respective axis or axes such that acceleration, or force, is positive in one direction along the respective axis, and negative in the opposite direction along the respective axis. Therefore, depending on the absolute orientation of the relevant sensor 207, gravity is detected as a positive or negative acceleration. In this embodiment, the relevant sensor 207 is the sensor 207 that measures acceleration along the Y-axis (see in particular FIG. 4), since in the arrangement described above the Y-axis of the TPMS device is vertically oriented.

In preferred embodiments, the TPMS device is programmed to check, or measure, the vertical acceleration in response to detecting an inflation event, e.g. that the tire has been inflated, partially inflated or is in the process of being inflated. This may be achieved in any convenient manner. For example, the controller 201 may cause the measurement to be made upon detecting an increase in pressure in the tire T to above a threshold level or by more than a threshold amount, as is convenient. Alternatively, the user may send a command to the TPMS device using the tool 301 that causes the TPMS device to measure the vertical acceleration experienced.

The TPMS device is programmed to know the relationship between the polarity of the acceleration sensing axis and the body of the TPMS device. For example, with reference to FIG. 5, the positive direction of the Y-axis is in the rear-to-front direction of the TPMS device, while the negative direction of the Y-axis is in the front-to-rear direction of the TPMS device (alternative embodiments may adopt the opposite convention). Therefore, in this example if the TPMS device detects positive gravitational acceleration when the wheel is face up or face down, then it can determine that its front is facing downwards, while if the TPMS device detects negative acceleration in the position outlined above it can determine that its front is facing upwards (or vice versa depending on the configuration of the TPMS device). More generally, depending on the polarity of the detected gravitational acceleration, the TPMS device can determine in which one of two absolute orientations it is disposed, the two orientations being 180° rotationally spaced apart about the X or Z axis. It is noted that these two orientations are not defined relative to the tire or the wheel rim, and instead may be defined with respect to a horizontal axis (which may be the X or Z axis in this example), or more conveniently referred to as "upwards" or "downwards". The TPMS device only needs to determine the polarity of the detected acceleration in the vertical direction, not necessarily its magnitude. Optionally, the magnitude of the detected acceleration is measured (i.e. the TPMS device may determine if it detects acceleration of ±g). The determination of magnitude may be used to confirm that the wheel is in a desired state, i.e. in a designated orientation and not rotating.

When the TPMS device has determined whether it is in the upwards or downwards orientation, it correlates, or combines, this information with the information indicating whether the tire and rim assembly is face up to face down to determine the orientation of the TPMS device with respect to the wheel rim R (and more particularly with respect to the front face F of the wheel rim R) (607).

Therefore, with reference to assumption a) above, the TPMS device can determine if it is in the standard orientation with respect to the rim R or in the opposite orientation.

In preferred embodiments, in response to determining that the wheel on which it has been mounted has been removed from the vehicle, and that the tire has been deflated, the TPMS device 111, 112, 113*a*, 113*b*, 114*a*, 114*b* is configured to erase TPMS device orientation data that it has stored. This is because it may be assumed that the tire has been (or is likely to be) removed from the rim and so any data indicating the orientation of the TPMS device with respect to the wheel rim R is no longer reliable. For example, if the tyre was re-fitted to the wheel rim in the opposite orientation, this would result in an incorrect calculation of the wheel's rotational direction, which could cause an erroneous wheel location determination during auto-location. This orientation data erasing method is particularly, but not exclusively, suitable for use in scenario 2 outlined above, i.e. in the field. The erasing of orientation data may be a configurable option for the TPMS device, for example being enabled or disabled during programming of the TPMS device, e.g. by the tool 301.

Figure 7:
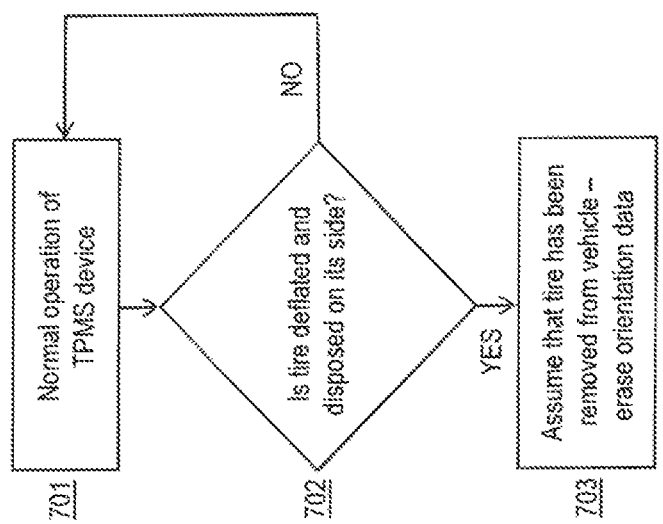
FIG. 7 is a flow chart illustrating an embodiment of a method of erasing orientation data.

Referring now to FIG. 7 a preferred orientation data erasing method is illustrated. At 701 the TPMS device is assumed to be installed on a wheel and operating normally. The TPMS device may have been installed using either of the first or second methods described above, or any other convenient orientation determining method, so that its orientation with respect to the wheel rim is known, and is stored by the TPMS device, for example in any suitable memory available to the controller 201. The normal operation of the TPMS may include using the acceleration detected along the Z and/or X axes to determine its direction of rotation, and transmitting this information to the ECU 120 for the purpose of auto-location. If, during use, the TPMS device determines that the tire has been deflated and is disposed on its side (702), then it erases the data that it has stored indicating its orientation with respect to the wheel rim (703), otherwise normal operation of the TPMS device continues and the stored orientation data is maintained.

The TPMS device may determine that the tire is deflated by any convenient means, for example by detecting air (or other gas as applicable) pressure in the tire at less than a threshold level (e.g. less than 5 psi).

Determining that the wheel is on its side (face up or face down) is an indication that the wheel has been removed from the vehicle. The TPMS device may determine that the wheel on which it is mounted is on its side by any convenient means, for example by measuring (using the relevant sensor 207) the acceleration experienced by the TPMS device along an axis that would be vertical if the wheel were on its side (i.e. the Y-axis in the present example), and determining whether or not the acceleration is equal to (or substantially equal to) +1 g or −1 g, where g denotes gravitational acceleration—if the acceleration measured along this axis is substantially equal in magnitude to gravitational acceleration, then this is an indication that the wheel is disposed on its side (i.e. face up or face down). Alternatively, or in addition, the TPMS device may determine that the wheel is located on its side by measuring (using the relevant sensor(s) 207) the acceleration experienced by the TPMS device along an axis that would be horizontal if the wheel were on its side (i.e. the X-axis and/or the Z-axis in the present example), and determining whether or not the respective acceleration is equal to (or substantially equal to) zero, or is less than a threshold value (e.g. less than ±0.25 g as applicable)—if the acceleration measured along this axis is substantially equal to zero or less than the relevant threshold value, then this is an indication that the wheel is disposed on its side (i.e. face up or face down). Detecting that the wheel has been removed from the vehicle may alternatively be achieved by any other convenient means.

In preferred embodiments, the TPMS device determines that the wheel is on its side by detecting ±g acceleration along the Y-axis and zero acceleration along the X-axis and/or the Z-axis. In alternative embodiments detection of any one of these conditions may cause the TPMS device to determine that the wheel is on its side. In preferred embodiments, the TPMS device erases the orientation data upon determining that the wheel has been removed and that the tire has been deflated. In alternative embodiments, the TPMS device may erase the orientation data upon determining that either one of these conditions is met.

A third preferred method of determining the orientation of the TPMS device with respect to the wheel rim is now described, the third method being particularly, but not exclusively, applicable in scenario 2 above. This embodiment is particularly suited to cases in which the wheel, i.e. the assembly of the tire and the wheel rim, is upright (i.e. in its normal road-going orientation) when being inflated. For example this is typically the case when the wheel is being inflated in the field, e.g. following a repair, replacement or aftermarket modification. Such circumstances may involve the TPMS device being re-fitted to a tire, or a new TPMS being fitted, or a tire being fitted, in which case the orientation of the TPMS device with respect to the wheel rim must be determined.

The third preferred method is described with reference to FIG. 8. The TPMS device is mounted on the tire T (801). As described above the TPMS device may be mounted on the tire in either one of two orientations with respect to the tire. The user marks the location of the mounted TPMS device on an outer surface of the tire (802). This may be achieved in any convenient manner, for example using chalk, crayon, marker, ink, sticker and so on. Preferably, the mark (not shown) is placed on the front side wall S of the tire T that is aligned with the front face F of the rim R when fitted.

The marked tire (with mounted TPMS device) is then mounted on the wheel rim R (803) in accordance with the mark, i.e. so that the marked side S is aligned with the front face F of the rim R.

The tire T is ready for inflation. It is assumed that the wheel (i.e. the assembly of the tire T and the rim R) is disposed in its upright position when the tire is being inflated. Optionally, the wheel is located in a tire cage (not shown), also known as a tire inflation safety cage. Typically, the tire cage is configured to hold the wheel in its upright position during inflation. Tire cages are commonly used when inflating relatively large tires, e.g. truck tires. In any event, with the wheel in its upright orientation, the wheel is rotated to orient the TPMS device such that a designated one of its acceleration measurement axes is vertically disposed (804)—in this state the wheel may be said to be in a designated orientation.

In the present example, when the wheel is upright either the X-axis or the Z-axis of the TPMS device can be vertically disposed depending on the angular position of the wheel. In particular, the X-axis is vertically disposed when the angular position of the wheel is such that the TPMS device is angularly displaced by 90° from vertical, with respect to the centre of the wheel, i.e. the angular position of the TPMS device is ±90° with respect to the central vertical axis of the wheel. With reference to a notional analogue clock face imposed on the front face F of the rim R, this corresponds to the 3 o'clock and 9 o'clock positions. These two positions may be referred to as designated orientations of the wheel in this embodiment. Similarly, the Z-axis is vertically disposed when the angular position of the wheel is such that the TPMS device is aligned with the central vertical axis of the wheel. With reference to a notional analogue clock face, this corresponds to the 12 o'clock and 6 o'clock positions. These two positions may be referred to as designated orientations of the wheel in the respective embodiment. In the present example, it is assumed that the TPMS device is programmed such that the X-axis is the designated axis for this embodiment of the third preferred method. It will be understood that in alternative embodiments, the Z-axis may be the designated axis.

When the wheel is stationary (in particular not rotating), the only acceleration experienced by the wheel in the vertical direction is gravitational acceleration. Depending on the absolute orientation of the TPMS device, it detects gravity with one or other of a positive or negative polarity, i.e. as a positive or negative acceleration. More particularly, depending on the absolute orientation of the relevant sensor 207, gravity is detected as a positive or negative acceleration. In this embodiment, the relevant sensor 207 is the sensor 207 that measures acceleration along the X-axis. In alternative embodiments, the relevant sensor 207 may be the sensor 207 that measures acceleration along the Z-axis. It is noted that it may be the same sensor that measures acceleration along the X-axis and Z-axis (and optionally also the Y-axis).

The TPMS device is programmed to know the relationship between the polarity of the acceleration sensing axis and the body of the TPMS device. For example, with reference to FIG. 5, the positive direction of the X-axis is in the left-to-right direction of the TPMS device (as viewed), while the negative direction of the X-axis is in the right-to-left direction of the TPMS device (alternative embodiments may adopt the opposite convention). Therefore, taking the X-axis as the designated axis in this example, when the TPMS device is in an angular position where the X-axis is vertically disposed (3 o'clock or 9 o'clock in this example), then if it detects positive acceleration along the X-axis, it can determine that its right side is facing downwards, while if the TPMS device detects negative acceleration along the X-axis it can determine that its left side is facing downwards (or vice versa depending on the convention adopted). More generally, depending on the polarity of the detected gravitational acceleration, the TPMS device can determine in which one of two absolute orientations it is disposed. The two orientations are 180° rotationally spaced apart, for example about Z axis when the X-axis is the designated vertical axis, or about the X-axis in embodiments where the Z-axis is the designated vertical axis. It is noted that these two orientations are not defined relative to the tire or the wheel rim, and instead may be defined with respect to a horizontal axis (e.g. the Z axis is horizontal when the X-axis is the designated vertical axis, while the X-axis is horizontal when the Z-axis is the designated vertical axis). In cases where the X-axis is the designated vertical axis, the orientations may be referred to as left-side up and right-side up, and for embodiments where the Z-axis is the designated vertical axis, the orientations may be referred to as right-way up and upside down.

When the TPMS device has determined its absolute orientation (as left-side up or right-side up in the present example), it combines this information with knowledge of which of the two relevant angular positions the wheel is in (3 o'clock or 9 o'clock in this example) to determine the orientation of the TPMS device with respect to the wheel rim R (and more particularly with respect to the front face F of the wheel rim R). Therefore, with reference to assumption a) above, the TPMS device can determine if it is in the standard orientation with respect to the rim R or in the opposite orientation. In preferred embodiments, the TPMS device is programmed to assume that the wheel is in a designated one of the two angular positions that cause the designated axis to be vertical. Accordingly, the user is required to rotate the wheel to the designated angular position before the TPMS device determines its orientation. In alternative embodiments, the TPMS device may be provided with information identifying the relevant angular position, e.g. by means of the tool 301, prior to making the determination of orientation.

Referring again to FIG. 8 which assumes that there is a designated angular position, the wheel is rotated by the user to locate the TPMS device in the designated angular position (804). Conveniently, this is facilitated by the provision of the mark on the tire that indicates the location of the TPMS device. The tire T is inflated (805). With the wheel maintained in its designated angular position, the TPMS device is caused to check the acceleration detected in the vertical direction to determine its absolute orientation as described above (806). The TPMS device only needs to determine the polarity of the detected acceleration in the vertical direction, not necessarily its magnitude. Optionally, the magnitude of the detected acceleration is measured (i.e. the TPMS device may determine if it detects acceleration of ±g). The determination of magnitude may be used to confirm that the wheel is in a desired state, i.e. in a designated orientation and not rotating.

When the TPMS device has determined its absolute orientation, it correlates, or combines, this information with the assumed angular position to determine the orientation of the TPMS device with respect to the wheel rim R (and more particularly with respect to the front face F of the wheel rim R) (807).

In preferred embodiments, the TPMS device is programmed to check, or measure, the vertical acceleration in response to detecting an inflation event, e.g. that the tire has been inflated, partially inflated or is in the process of being inflated. This may be achieved in any convenient manner. For example, the controller 201 may effect the measurement upon detecting an increase in pressure in the tire T to above a threshold level or by more than a threshold amount, as is convenient. In such embodiments, the user should not inflate the tire until after the wheel has been rotated to the relevant angular position. Alternatively, the user may send a command to the TPMS device using the tool 301 that causes the TPMS device to measure the vertical acceleration experienced. In such cases, the tire may be inflated before or after the wheel has been rotated to the relevant angular position.

Optionally, the TPMS device may be programmed with any relevant data as required, conveniently using tool 301. This is typically performed prior to inflation. Alternatively inflation may be performed before or simultaneously with the programming. Such programming may be used as a trigger for the TPMS device to perform step 806.

In alternative embodiments, it is not necessary to place a mark on the tire to indicate the location of the TPMS sensor. The location of the TPMS device on the wheel may be determined by any other suitable means. For example the tool 301 may be used to measure transponder signal strength between the tool 301 and the TPMS device, the location of the TPMS device being identified by locating where the signal strength is highest.

Figure 6:
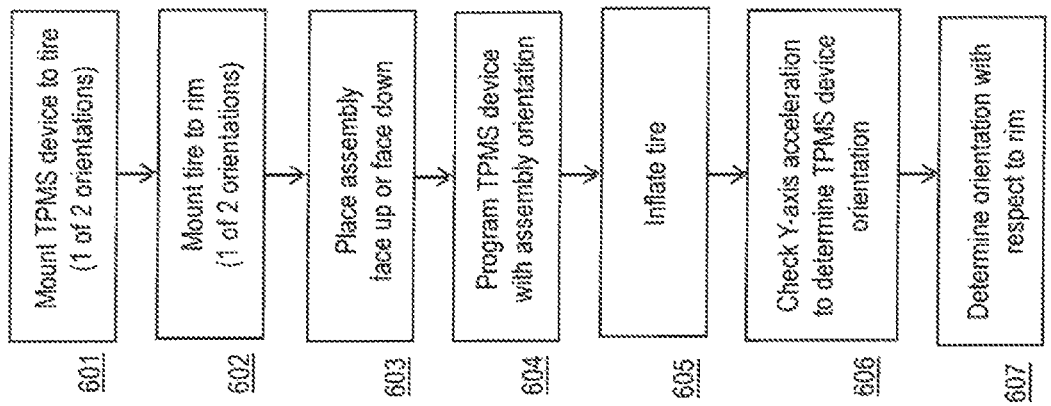
FIG. 6 is a flow chart illustrating an embodiment of a second method of determining the orientation of the TPMS device with respect to the wheel rim.
Figure 8:
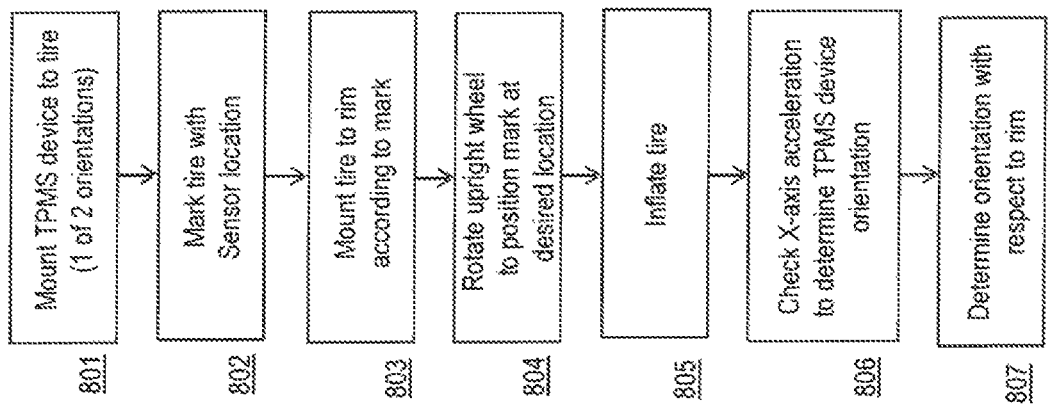
FIG. 8 is a flow chart illustrating an embodiment of a third method of determining the orientation of the TPMS device with respect to the wheel rim.

The TPMS device may be configured to perform either one or both of the methods of FIGS. 6 and 8 as required. For example, the TPMS device may perform the method of FIG. 6 in response to determining that it is face up or face down, or upon determining that it has been provided with face up or face down data. The TPMS device may perform the method of FIG. 8 in response to determining that it is upright, or subsequent to having previously performed the method of FIG. 6 (which is particularly suited for initial assembly of the tire and rim).

The invention is not limited to the embodiment(s) described herein but can be amended or modified without departing from the scope of the present invention.

What is claimed is:

1. A method of determining an orientation of a tire mounted device with respect to a wheel rim on which the tire is fitted to form a wheel, wherein the tire mounted device includes at least one sensor for detecting acceleration along at least one axis, the method comprising:
   with said wheel in a designated orientation and not rotating, determining a polarity of acceleration along a vertical axis using said at least one sensor;
   determining which of a first absolute orientation or a second absolute orientation said tire mounted device is in depending on the determined polarity;
   correlating said first absolute orientation or said second absolute orientation with said designated orientation to determine which of a first orientation with respect to said wheel rim or a second orientation with respect to said wheel rim said tire mounted device is in.

2. The method of claim 1, wherein determining the polarity of acceleration involves determining whether the acceleration along said vertical axis has a magnitude substantially equal to gravitational acceleration.

3. The method of claim 1, wherein said tire mounted device includes a pressure sensor for measuring fluid pressure in said tire, and wherein said determining the polarity of acceleration is performed in response to detecting, using said pressure sensor, inflation of said tire.

4. The method of claim 1, wherein said tire mounted device includes a wireless receiver, and wherein said determining the polarity of acceleration is performed in response to receiving, via said wireless receiver, a signal indicating that the orientation of the tire mounted device with respect to the wheel rim is to be determined.

5. The method of claim 1, further including mounting said tire mounted device on said tire in either one of a first orientation or a second orientation with respect to said tire.

6. The method of claim 5, wherein in each of said first or second orientation with respect to the tire, the device is rotated by 180° with respect to the other of said first and second orientations with respect to the tire about an axis that is normal to a surface on which the device is mounted.

7. The method of claim 1, wherein in each of said first or second absolute orientations, the device is rotated by 180° with respect to the other of said first and second orientations about an axis of the device.

8. The method of claim 1, further including fitting said tire to said wheel rim in either one of a first or second tire orientation.

9. The method of claim 1, wherein said designated orientation of said wheel is either one of a first designated orientation in which a front face of said wheel rim faces upwards, or a second designated orientation in which said wheel rim faces downwards.

10. The method of claim 9, further including placing said wheel in either one of said first or second designated orientations.

11. The method of claim 9, further including providing to said tire mounted device an indication of which of said first or second designated orientations said wheel is in.

12. The method of claim 11, wherein said tire mounted device includes a wireless receiver, and wherein said providing said indication includes sending a wireless signal to said wireless receiver, said wireless signal including said indication of which of said first or second designated orientations said wheel is in.

13. The method of claim 9, wherein said correlating involves correlating the determined absolute orientation with whichever of said first or second designated orientations the wheel is in.

14. The method of claim 9, wherein said at least one sensor is configured to measure acceleration at least along a second axis that is parallel with the rotational axis of the wheel, and wherein said determining the polarity of acceleration involves determining the polarity of acceleration along said second axis.

15. The method of claim 1, wherein in said designated orientation of said wheel, said wheel is upright and in an angular position in which an axis along which said at least one sensor is configured to measure acceleration is vertically disposed.

16. The method of claim 15, wherein said axis is a first axis that extends tangentially with respect to a mounting location of said tire mounted device on the wheel.

17. The method of claim 15, wherein said axis is a third axis that is normal to a surface on which the device is mounted.

18. The method of claim 15, further including placing said wheel in said designated orientation.

19. The method of claim 15, wherein said correlating involves correlating the determined absolute orientation with said angular position of the wheel.

20. The method of claim 15, wherein said angular position is a designated one of first and second angular positions in which said axis along which said at least one sensor is configured to measure acceleration is vertically disposed.

21. The method of claim 15, further including providing to said tire mounted device an indication of which of first or second angular positions, in which said axis along which said at least one sensor is configured to measure acceleration is vertically disposed, said wheel is in.

22. The method of claim 21, wherein said tire mounted device includes a wireless receiver, and wherein said providing said indication includes sending a wireless signal to said wireless receiver, said wireless signal including said indication of which of said first or second designated angular positions said wheel is in.

23. The method of claim 1, further including, in response to determining that the wheel has been removed from a vehicle and/or that the tire is deflated, erasing data indicating which of said first orientation with respect to said wheel rim or said second orientation with respect to said wheel rim said tire mounted device is in.

24. The method of claim 23, wherein determining that the wheel has been removed from the vehicle involves determining that the wheel is located on its side.

25. The method of claim 24, wherein determining that the wheel is located on its side involves measuring, using said at least one sensor, acceleration along an axis corresponding to a vertical axis when the wheel is on its side and comparing the measured acceleration with gravitational acceleration.

26. The method of claim 24, wherein determining that the wheel is located on its side involves measuring, using said at least one sensor, acceleration along an axis corresponding to a horizontal axis when the wheel is on its side, and determining whether or not the acceleration is equal to, or substantially equal to, zero, or is less than a threshold value.

27. A tire mountable device, being mountable with respect to a wheel rim on which the tire is fitted to form a wheel, the tire mounted device including at least one sensor for detecting acceleration along at least one axis, and further including a controller configured to determine, with said wheel in a designated orientation and not rotating, a polarity of acceleration along a vertical axis using said at least one sensor; to determine which of a first absolute orientation or a second absolute orientation said tire mounted device is in depending on the determined polarity; and to correlate said first absolute orientation or said second absolute orientation with said designated orientation to determine which of a first orientation with respect to said wheel rim or a second orientation with respect to said wheel rim said tire mounted device is in.

28. A tire pressure monitoring system comprising at least one tire mountable device that is mountable with respect to a wheel rim on which the tire is fitted to form a respective wheel, the tire mounted device including at least one sensor for detecting acceleration along at least one axis, the system further including a controller configured to determine, with said respective wheel in a designated orientation and not rotating, a polarity of acceleration along a vertical axis using said at least one sensor; to determine which of a first absolute orientation or a second absolute orientation said tire mounted device is in depending on the determined polarity; and to correlate said first absolute orientation or said second absolute orientation with said designated orientation to determine which of a first orientation with respect to said wheel rim or a second orientation with respect to said wheel rim said tire mounted device is in.

* * * * *